US006918477B2

(12) United States Patent
Tuanmu

(10) Patent No.: US 6,918,477 B2
(45) Date of Patent: Jul. 19, 2005

(54) DIRECTION SWITCH FOR HAND TOOL AND REVERSIBLE GEAR WRENCH

(75) Inventor: Tom Tuanmu, Taichung (TW)

(73) Assignee: Lea Way Hand Tool Corporation, Taichung (TW)

( * ) Notice: Subject to any disclaimer, the term of this patent is extended or adjusted under 35 U.S.C. 154(b) by 0 days.

(21) Appl. No.: 10/460,335

(22) Filed: Jun. 12, 2003

(65) Prior Publication Data

US 2004/0251105 A1 Dec. 16, 2004

(51) Int. Cl.[7] .......................... F16D 41/16; B25B 13/46
(52) U.S. Cl. .......................... 192/43.1; 192/47; 81/63.2
(58) Field of Search ........................... 192/43, 43.1, 46, 192/47; 81/63, 63.2

(56) References Cited

U.S. PATENT DOCUMENTS 1,078,059 A * 11/1913 Mossberg ...................... 81/63
5,522,287 A 6/1996 Chiang
5,913,954 A 6/1999 Arnold et al.
5,957,009 A 9/1999 McCann
6,161,454 A * 12/2000 Chaconas .................. 81/63.2
2004/0089111 A1 * 5/2004 Hsien ......................... 81/63.2

* cited by examiner

*Primary Examiner*—Richard M. Lorence
(74) *Attorney, Agent, or Firm*—Ladas & Parry LLP

(57) ABSTRACT

A direction switch for a wrench has first and second control members. The first control member includes a first pivot and a first lever. The second control member includes a second pivot and a second lever. The first control member and the second control member are mounted to first and second side of the wrench, respectively. The first and second control members are operatively connected to each other by a coupling provided between the control members to allow simultaneous actuation of the control members.

12 Claims, 6 Drawing Sheets

DIRECTION SWITCH FOR HAND TOOL AND REVERSIBLE GEAR WRENCH

CROSS-REFERENCES TO RELATED APPLICATIONS

Not Applicable

STATEMENT REGARDING FEDERALLY SPONSORED RESEARCH OR DEVELOPMENT

Not Applicable

FIELD OF INVENTION

This invention is related to a direction switch for a gear wrench allowing an operator to switch the operative direction of a gear ring from either side of the wrench.

BACKGROUND OF INVENTION

Conventional gear wrenches featuring reversible function are provided with a direction switch button on a single side of the wrench. With the fast development of technology, the reduced or compact sizes of many components have reduced space for maneuver around the components, such as within the packed space in a vehicular engine room, rendering inconvenience in operation of hand tools. As shown in FIGS. 8A and 8B, when an operator intends to switch the operative direction of the wrench after inserting a wrench into a packed space, due to the lack of space for maneuver around the direction switches CB, CA, the operator must withdraw the wrench first for adjusting the operative direction, which is very time-consuming. A gear wrench allowing an operator to switch the operative direction a gear ring from either side of the wrench (such as that illustrated in FIGS. 9A and 9B) will, thus, significantly increase the efficiency.

SUMMARY OF INVENTION

It is an objective of this invention to provide a direction switch allowing an operator to switch the operative direction of a gear ring from either side of the wrench.

It is another objective of this invention to provide a reversible gear wrench adopting such a direction switch.

To achieve the above objectives, this invention provides a direction switch, comprising: a first control member and a second control member. The first control member includes a first pivot and a first lever. The second control member includes a second pivot and a second lever. The first control member and the second control member are mounted to a first and a second side of the wrench, respectively, wherein the first and second control members are operatively connected to each other by means of a coupling means provided between the two control members to allow simultaneous actuation of the control members. Hence, when one of the control members provided on one side of the wrench is pivoted, the control member provided on the other side will be pivoted simultaneously.

This invention provides an alternative direction switch constructing of a single component.

The structures and characteristics of this invention can be realized by referring to the appended drawings and explanations of the preferred embodiments.

DETAILED DESCRIPTIONS OF EMBODIMENTS

A direction switch 100–500 of this invention is to be adopted in a wrench W illustrated in FIGS. 1A to 1D, which may be operated from a first side S1 as well as a second side S2 of the wrench W for switching the operative direction of a gear ring WH.

Figure 2:
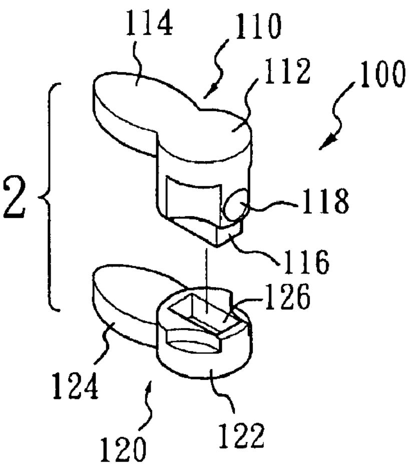
FIG. 2 is an exploded view illustrating a first embodiment of this invention.

As shown in FIG. 2, a direction switch 100 according to this invention includes a first control member 110 and a second control member 120.

The first control member 110 includes a first pivot 112 and a first lever 114. The first pivot 112 is pivotally mounted to a first side S1 of the wrench. The first lever 114 extends from the first pivot 112 along a surface of the first side S1 to be dialed by an operator's finger. The second control member 120 includes a second pivot 122 and a second lever 124. The second pivot 122 is pivotally mounted to a second side S2 of the wrench. The second lever 124 extends from the second pivot 122 along a surface of the second side S2 to be dialed by an operator's finger. In particular, the first control member 110 and the second control member 120 are operatively connected to each other to allow simultaneous actuation of the control members 110, 120. Preferably, the first pivot 112 and the second pivot 122 are formed with a projection 116 and a matching recess 126 to serve as an operative connection.

Figure 1A:
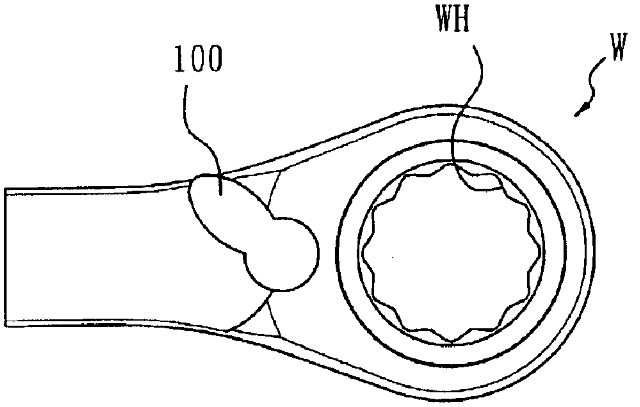
FIGS. 1A to 1D are schematic views illustrating a wrench according to this invention.
Figure 1B:
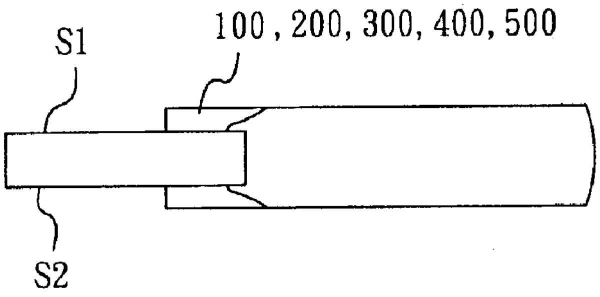
Figure 1C:
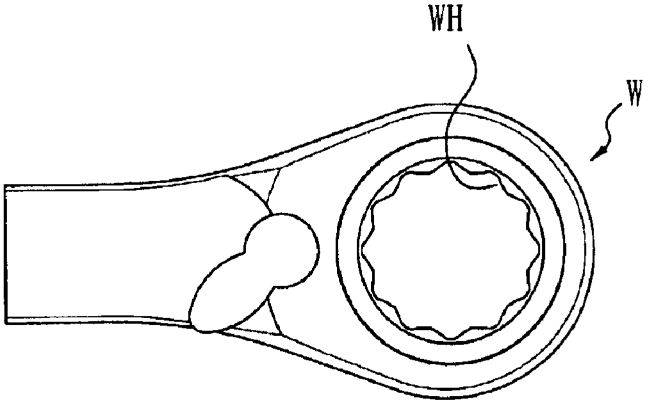
Figure 1D:
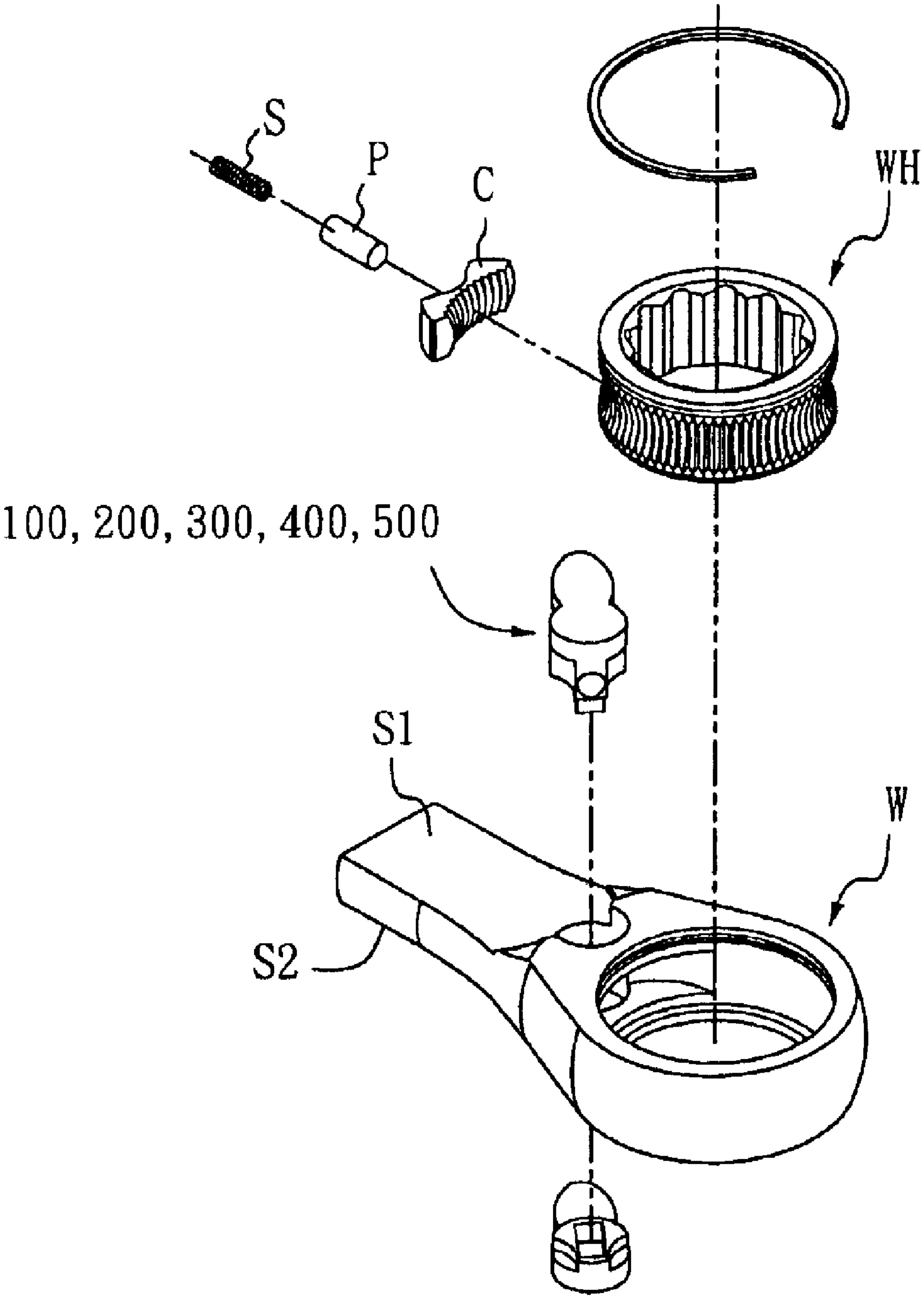

According to this embodiment, the first control member 110 is formed with a radial bore 118 for placement of an urging spring S and an urging pin P. With reference to FIG. 1D, when an operator dials the direction switch 100, the direction switch 100 will drive the urging pin P to pivot, thereby subjecting an urging pawl C formed with teeth and placed between a gear ring WH and the direction switch 100 to urge against teeth formed on the gear ring WH in the direction against which the urging pin P urges, for switching the operative direction of the wrench.

Figure 3:
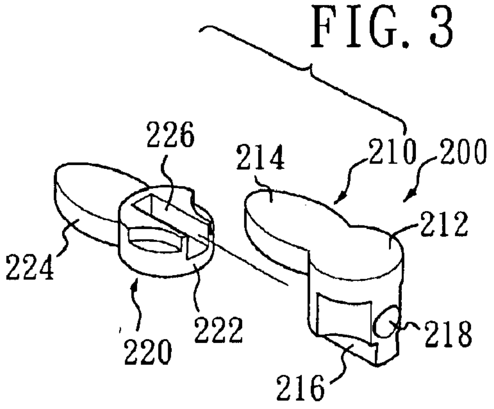
FIG. 3 is an exploded view illustrating a second embodiment of this invention.

FIG. 3 illustrates a direction switch 200 according to a second embodiment of this invention. The direction switch 200 includes a first control member 210 and a second control member 220. The first control member 210 includes a first pivot 212 and a first lever 214. The first pivot 212 is pivotally mounted to a first side S1 of the wrench. The first lever 214 extends from the first pivot 212 along a surface of the first side S1 to be dialed by an operator's finger. The second control member 220 includes a second pivot 222 and a second lever 224. The second pivot 222 is pivotally mounted to a second side S2 of the wrench. The second lever 224 extends from the second pivot 222 along a surface of the second side S2 to be dialed by an operator's finger. The first pivot 212 is formed thereon with a projection 216 and the second pivot 22 is formed thereon with a slide groove 226 subjecting the first control member 210 to be operatively connected to the second control member 220 to allow simultaneous actuation of the control members 210, 120. The first control member 210 may also be formed with a radial bore 218 for placement of an urging spring S and an urging pin P having functions identical to those previously described.

Figure 4A:
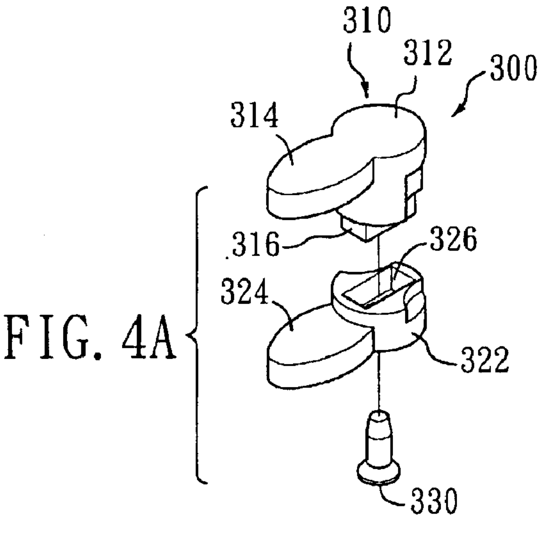
FIGS. 4A and 4B are exploded views illustrating a third embodiment of this invention.
Figure 4B:
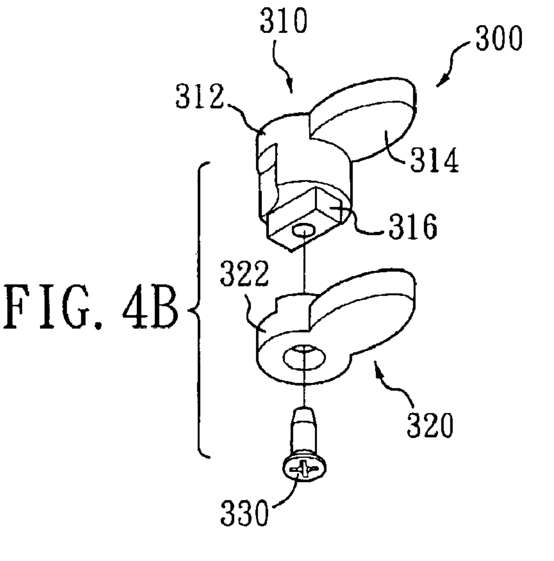

FIG. 4 illustrates a direction switch 300 according to a third embodiment of this invention. The direction switch 300 includes a first control member 310 and a second control member 320. The first control member 310 includes a first pivot 312 and a first lever 314. The first pivot 312 is pivotally mounted to a first side S1 of the wrench. The first lever 314 extends from the first pivot 312 along a surface of the first side S1 to be dialed by an operator's finger. The second control member 320 includes a second pivot 322 and a second lever 324. The second pivot 322 is pivotally mounted to a second side S2 of the wrench. The second lever 324 extends from the second pivot 322 along a surface of the second side S2 to be dialed by an operator's finger. The first pivot 312 and the second pivot 322 are each formed with a projection 316 and a matching recess 326, respectively, subjecting the first control member 310 to be operatively connected to the second control member 320 to allow simultaneous actuation of the control members 310, 320. A screw 330 retains the second control member 320 to the first control member 310. The first control member 310 may also be formed with a radial bore (not shown) for placement of an urging spring S and an urging pin P.

Figure 5A:
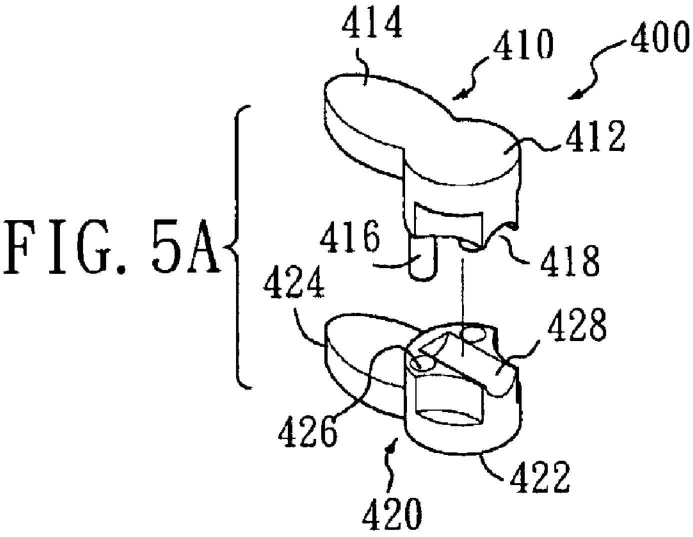
FIGS. 5A and 5B are exploded views illustrating a fourth embodiment of this invention.
Figure 5B:
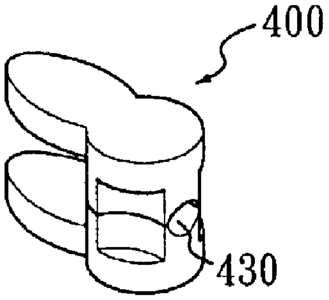

FIGS. 5A and 5B illustrate a direction switch 400 according to a fourth embodiment of this invention. The direction switch 400 includes a first control member 410 and a second control member 420. The first control member 410 includes a first pivot 412 and a first lever 414. The first pivot 412 is pivotally mounted to a first side S1 of the wrench. The first lever 414 extends from the first pivot 412 along a surface of the first side S1 to be dialed by an operator's finger. The second control member 420 includes a second pivot 422 and a second lever 424. The second pivot 422 is pivotally mounted to a second side S2 of the wrench. The second lever 424 extends from the second pivot 422 along a surface of the second side S2 to be dialed by an operator's finger. The first pivot 412 is formed thereon with at least one projection 416 and the second pivot 422 is formed thereon with at least one recess 426 matching the projection 416, subjecting the first control member 410 to be operatively connected to the second control member 420 to allow simultaneous actuation of the control members 410, 420. The first control member 410 and the second control member 420 are formed with halved semicircular recesses 418 and 428 on the first pivot 412 and second pivot 422, respectively, for jointly constructing a radial bore 430 for placement of an urging spring S and an urging pin P.

Figure 6A:
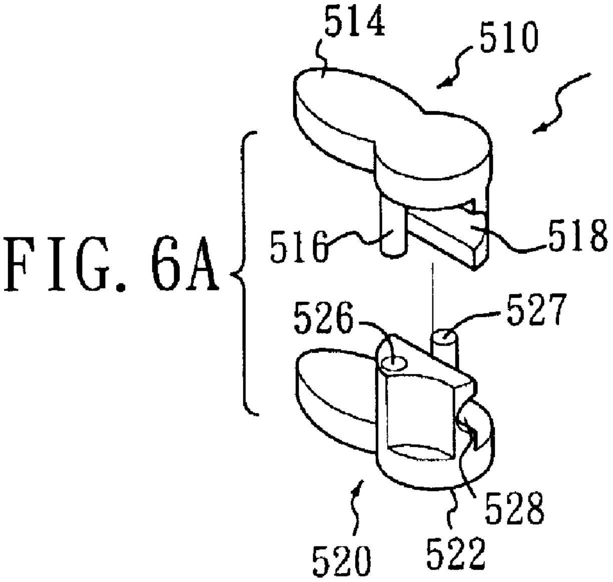
FIGS. 6A and 6B are exploded views illustrating a fifth embodiment of this invention.
Figure 6B:
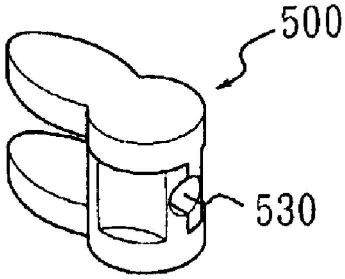

FIGS. 6A and 6B illustrate a direction switch 500 according to a fifth embodiment of this invention similar to the fourth embodiment of this invention. The direction switch 500 includes a first control member 510 and a second control member 520. The first control member 510 includes a first pivot 512 and a first lever 514. The first pivot 512 is formed thereon with at least one projection 516 and one recess (not shown); the second pivot 522 is formed thereon with at least one recess 526 matching the projection 516 and one projection 527 matching the recess formed on the first pivot 512, subjecting the first control member 510 to be operatively connected to the second control member 520 to allow simultaneous actuation of the control members 510, 520. The first control member 510 and the second control member 520 are formed with halved semicircular recesses 518 and 528, respectively, for jointly constructing a radial bore 530 for placement of an urging spring S and an urging pin P as shown in FIG. 1D.

Figure 7:
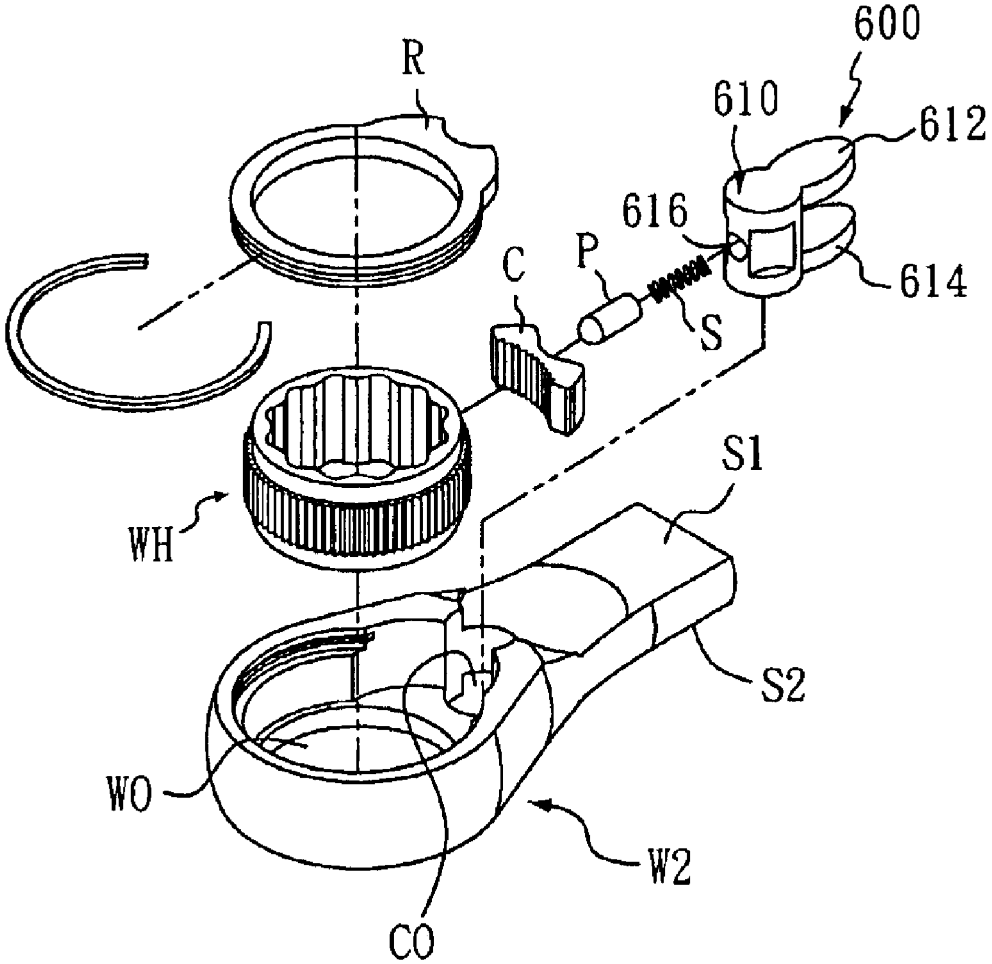
FIG. 7 is an exploded view illustrating a wrench adopting a sixth embodiment of this invention.
Figure 8A:
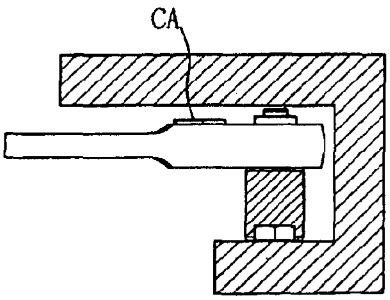
PRIOR ART FIG. 8A
FIGS. 8A and 8B illustrates states under which a conventional reversible gear wrench having a direction switch provided on a single side thereof, is operated.
Figure 8B:
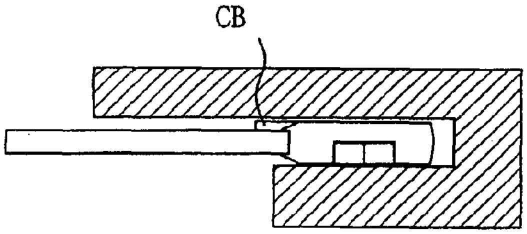
PRIOR ART FIG. 8B
Figure 9A:
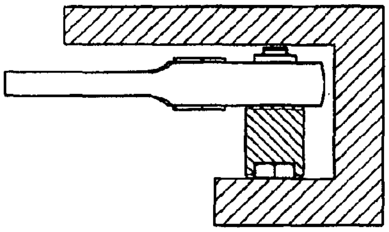
FIGS. 9A and 9B illustrate states under which a reversible gear wrench having a direction switch of this invention, is operated.
Figure 9B:
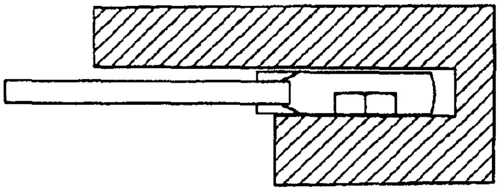

FIG. 7 illustrates a direction switch 600 according to a sixth embodiment of this invention. The direction switch 600 includes a shaft 610 and a first lever 612 and a second lever 614 extending from the shaft 610 and spaced apart from one another to straddle over the first side S1 and the second side S2 of wrench W2.

According to this embodiment, the shaft 610 is formed with a radial bore 616 on an end thereof opposing an end which the first and second levers 612, 614 extend from for placement of an urging spring S and an urging pin P. The wrench W2 adapted to the direction switch 600 includes a gear opening WO, a receiving hole CO in communication with the gear opening WO and penetrating through the wrench W2, and an annular lid R. In assembly, the direction switch 600 is first placed into the receiving hole CO through the gear opening WO. The annular lid R then covers a side of the gear opening WO for retaining the urging spring S, urging pin P, urging pawl C and gear ring WH in their proper locations within the wrench W2.

As such, when an operator dials the direction switch 600, the direction switch 600 will drive the urging pin P to pivot, thereby subjecting the urging pawl C to urge against teeth formed on the gear ring WH in accordance with the direction against which the urging pin P urges, for switching the operative direction of the wrench W2.

This invention is related to a novel creation that makes a breakthrough in the art. Aforementioned explanations, however, are directed to the description of preferred embodiments according to this invention. Various changes and implementations can be made by persons skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

LISTING OF NOMENCLATURES

| | |
|---|---|
| 100, 200, 300, 400, 500, 600 | direction switch |
| 110, 210, 310, 410, 510 | first control member |
| 112, 212, 312, 412, 512 | first pivot |
| 114, 214, 314, 414, 514, 612 | first lever |
| 116, 216, 316, 416, 516 | projection |
| 118, 218, 318, 616 | radial bore |
| 120, 220, 320, 420, 520 | second control member |
| 122, 222, 322, 422, 522 | second pivot |
| 124, 224, 324, 424, 524, 614 | second lever |
| 126, 326, 426, 526 | recess |
| 226 | slide groove |
| 330 | screw |
| 418, 428, 518, 528 | halved semicircular recess |
| 430, 530 | radial bore |
| 610 | shaft |
| C | urging pawl |
| CO | receiving hole |
| S | urging spring |
| S1 | first side |

-continued

| LISTING OF NOMENCLATURES | |
|---|---|
| S2 | second side |
| P | urging pin |
| R | annular lid |
| W | reversible gear wrench |
| W2 | reversible gear wrench |
| WH | gear ring |
| WO | gear opening |

What is claimed is:

1. A direction switch for a hand tool for switching an operative direction of a gear ring of the hand tool having a first side and a second side, the direction switch comprising:

a shaft;

a first lever and a second lever extending from the shaft and spaced apart from one another to straddle over the first side and the second side of hand tool, wherein the shaft includes:

a first control member, having a first pivot and the first lever, the first pivot being pivotally mounted to the first side of the hand tool;

a second control member, having a second pivot and the second lever, the second pivot being pivotally mounted to the second side of the hand tool;

a coupling means provided between the first and second control members for operatively connecting the first control member to the second control member to allow simultaneous actuation of the first and second control members; and the first pivot and the second pivot are each formed with a halved semicircular recess jointly constructing a radial bore.

2. The direction switch for a hand tool according to claim 1, wherein the coupling means includes at least one projection and at least one recess matching the projection, provided on the first and second control members, respectively, for operatively connecting the first and second control members.

3. The direction switch for a hand tool according to claim 1, wherein the first pivot is formed with a radial bore.

4. The direction switch for a hand tool according to claim 1, wherein the first lever extends from the first pivot along a surface of the first side, and the second lever extends from the second pivot along a surface of the second side.

5. The direction switch for a hand tool according to claim 1, further comprising: a screw, for retaining the second control member to the first control member.

6. A reversible gear wrench formed with a first side, a second side, a gear opening, a receiving hole in communication with the gear opening and penetrating through the reversible gear wrench, comprising:

a gear ring, placed in the gear opening;

a direction switch, placed in the receiving hole, the direction switch including: a shaft; a first lever and a second lever extending from the shaft; the shaft being formed with a radial bore on an end thereof opposing an end which the first and second levers extend from, and the first and second levers being spaced apart from one another to straddle over the first side and the second side of reversible gear wrench;

an urging spring and an urging pin, placed in the radial bore;

an urging pawl, placed between the gear ring and the direction switch; and an annular lid, for covering a side of the gear opening for retaining the urging spring, urging pin, urging pawl and gear ring in the reversible gear wrench, wherein the shaft includes:

a first control member, pivotally mounted to the first side of the reversible gear wrench and formed with a first halved recess;

a second control member, pivotally mounted to the second side of the reversible gear wrench and formed with a second halved recess for constructing the radial bore with the first halved recess; and wherein the first control member is operatively connected to the second control member to allow simultaneous actuation of the first and second control members.

7. The reversible gear wrench according to claim 6, wherein the first and second control members include at least one projection and at least one recess matching the projection, respectively, for operatively connecting the first and second control members.

8. The reversible gear wrench according to claim 6, further comprising: a screw, for retaining the second control member to the first control member.

9. The reversible gear wrench according to claim 6, wherein the first control member and the second control member each include a pivot and a lever, the pivot being pivotally mounted to the reversible gear wrench.

10. The reversible gear wrench according to claim 6, wherein the first control member and the second control member each include a pivot and a lever, the pivot being pivotally mounted to the reversible gear wrench.

11. The reversible gear wrench according to claim 7, wherein the first control member and the second control member each include a pivot and a lever, the pivot being pivotally mounted to the reversible gear wrench.

12. The reversible gear wrench according to claim 8, wherein the first control member and the second control member each include a pivot and a lever, the pivot being pivotally mounted to the reversible gear wrench.

* * * * *